United States Patent [19]

Ohhashi

[11] Patent Number: 4,592,007
[45] Date of Patent: May 27, 1986

[54] FULL ADDER USING COMPLEMENTARY MOSFETS

[75] Inventor: Masahide Ohhashi, Sagamihara, Japan

[73] Assignee: Tokyo Shibaura Denki Kabushiki Kaisha, Kawasaki, Japan

[21] Appl. No.: 428,033

[22] Filed: Sep. 29, 1982

[30] Foreign Application Priority Data

Dec. 3, 1981 [JP] Japan .................. 56-194768

[51] Int. Cl.[4] .............................................. G06F 7/50
[52] U.S. Cl. .................................................... 364/784
[58] Field of Search ............... 364/784, 786, 770, 712, 364/785

[56] References Cited

U.S. PATENT DOCUMENTS

| | | |
|---|---|---|
| 3,602,705 | 8/1971 | Cricchi et al. .................. 364/786 |
| 3,767,906 | 10/1973 | Pryor. | |
| 3,843,876 | 10/1974 | Fette et al. ...................... 364/786 |
| 4,054,788 | 10/1977 | Maitland et al. ................ 364/770 |
| 4,254,471 | 3/1981 | Hunt ................................. 364/786 |
| 4,463,439 | 7/1984 | Weinberger ..................... 364/784 |

OTHER PUBLICATIONS

The 13th Conference on "Solid State Devices", The Japan Society of Applied Physics, Aug. 26-27, 1981, pp. 15-16.
Proceedings of the Conference on Solid State Devices, Tokyo, 1981, JJAP, vol. 21 (1982), Supplement 21-1 pp. 51-52.

*Primary Examiner*—David H. Malzahn
*Attorney, Agent, or Firm*—Finnegan, Henderson, Farabow, Garrett & Dunner

[57] ABSTRACT

The invention provides a full adder having a logic circuit which has an inverter and a selector circuit, a logic circuit which has an inverter and a selector circuit, and a logic circuit which has a selector circuit and an inverter so as to produce a sum output signal S and a carry output signal C in response to three input signals X, Y and Z.

14 Claims, 17 Drawing Figures

FULL ADDER USING COMPLEMENTARY MOSFETS

BACKGROUND OF THE INVENTION

The present invention relates to a full adder applied to an operation circuit or the like.

Figure 1:
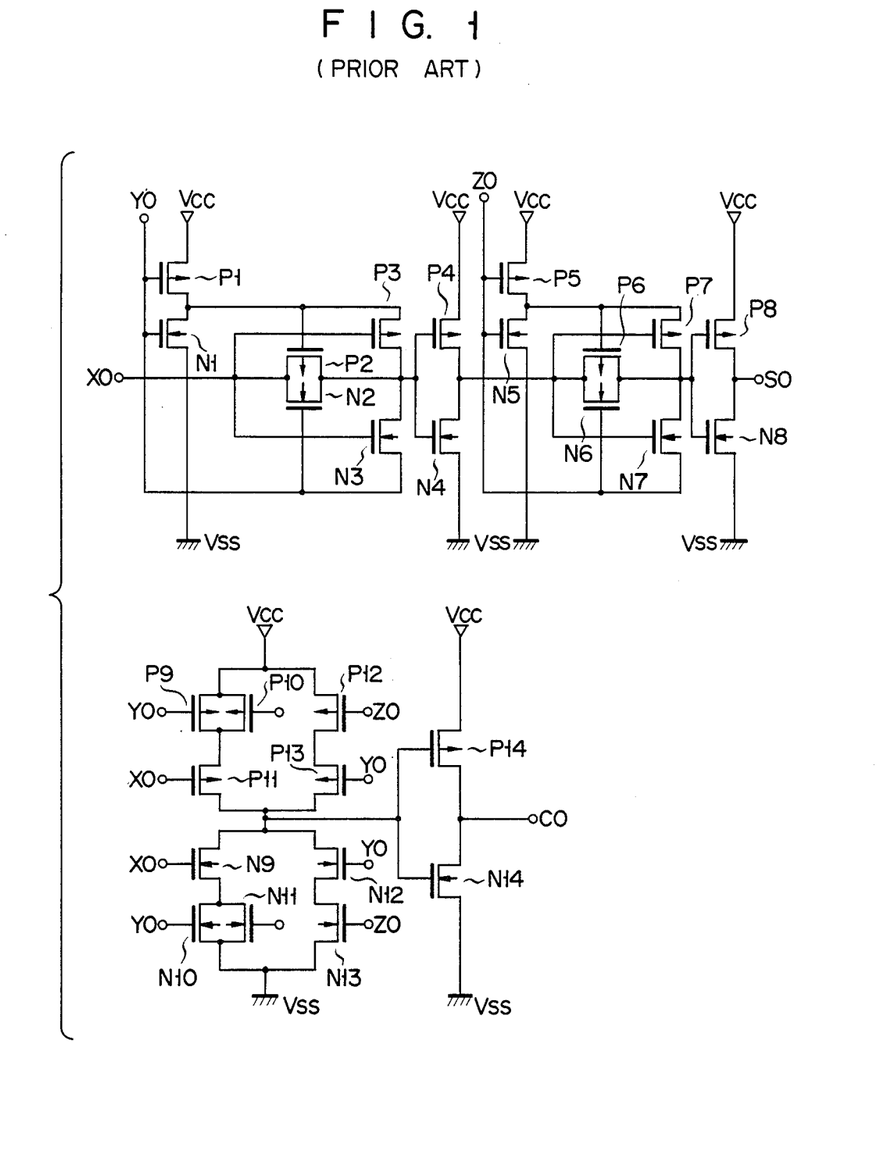
FIG. 1 is a circuit diagram of a conventional full adder.

FIG. 1 shows a conventional full adder which is composed of complementary MOSFETs. This full adder is described on PP. 51–54 of Proceedings of the conference on Solid State Devices, Tokyo, 1981; JJAP, vol. 21 (1982) Supplement 21-1. The full adder has p-channel MOSFETs P1 to P14 and n-channel MOSFETs N1 to N14. Reference symbols XO, YO and ZO denote input signals; CO, a carry output signal; SO, a sum output signal. The carry output signal CO and the sum output signal SO are given by the following relations:

$$SO = XO \oplus YO \oplus ZO$$

$$CO = XO \cdot YO + YO \cdot ZO + ZO \cdot XO$$

where symbol $\oplus$ denotes the exclusive OR, a point denotes the logical AND, and symbol + denotes the logical OR.

The conventional full adder with the arrangement shown in FIG. 1 has a disadvantage in that the number of elements is increased since 28 MOSFETs are used. Therefore, the chip size is increased when an adder is integrated.

SUMMARY OF THE INVENTION

It is, therefore, an object of the present invention to provide a full adder which is suitable for adopting complementary MOSFETs and which requires only a small number of elements.

According to an embodiment of the present invention, there is provided a full adder comprising: a first logic circuit having an inverter which receives a first input signal and a first selector circuit which receives the first input signal and an output signal from said first inverter and which selectively produces one of the first input signal and the output signal from said first inverter in response to a second input signal; a second logic circuit having a second inverter which receives an output signal from said first selector circuit and a second selector circuit which receives the output signal from said first selector circuit and an output signal from said second inverter and which selectively produces one of the output signal from said first selector circuit and the output signal from said second inverter in response to a third input signal; and a third logic circuit which receives a signal corresponding to the first input signal and a signal corresponding to the output signal from said second selector circuit and which selectively produces one of the signal corresponding to the first input signal and the signal corresponding to the output signal from said second selector circuit.

DETAILED DESCRIPTION OF THE PREFERRED EMBODIMENTS

Figure 2:
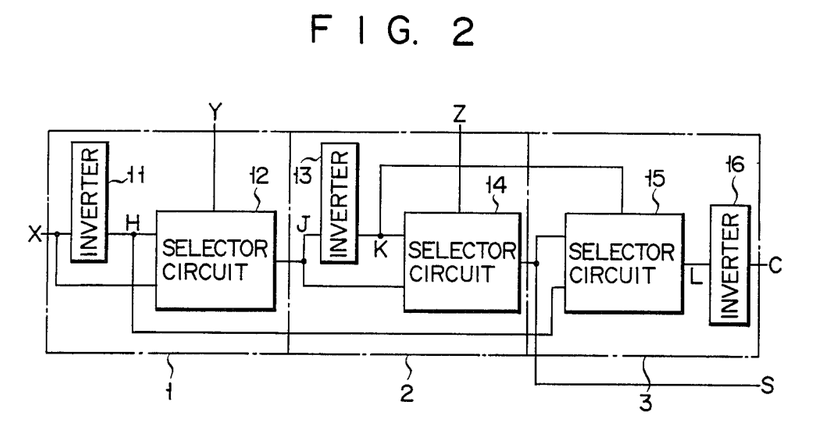
FIG. 2 is a block diagram of a full adder according to a first embodiment of the present invention.

FIG. 2 shows a full adder according to a first embodiment of the present invention. Reference numeral X denotes a first input signal; Y, a second input signal; Z, a third input signal; S, a sum output signal of an operation result; and C, a carry output signal of the operation result. The first and second input signals X and Y are supplied to a logic circuit 1. The logic circuit 1 has an inverter 11 and a selector circuit 12. The inverter 11 receives the first input signal X and produces a signal H. The output signal H is supplied to the first input terminal of the selector circuit 12. The first input signal X is supplied to the second input terminal of the selector circuit 12. The second input signal Y is supplied to the third input terminal of the selector circuit 12. The selector circuit 12 selects one of the output signal H from the inverter 11 and the first input signal X and produces it in response to the logical level of the second input signal Y. An output signal J from the selector circuit 12 and the third input signal Z are supplied to a logic circuit 2. The logic circuit 2 has an inverter 13 and a selector circuit 14. The inverter 13 receives the output signal J and produces an output signal K. The output signal K is supplied to the first input terminal of the selector circuit 14. The output signal J from the inverter 12 is supplied to the second input terminal of the selector circuit 14. The third input signal Z is supplied to the third input terminal of the selector circuit 14. The selector circuit 14 selects one of the output signal K from the inverter 13 and the output signal J from the selector circuit 12 and produces it in response to the logical level of the third input signal Z. The output signal S from the selector circuit 14, the output signal H from the inverter 11, and the output signal K from the inverter 13 are supplied to a logic circuit 3. The logic circuit 3 has a selector circuit 15 and an inverter 16. The output signal S from the selector circuit 14 is supplied to the first input terminal of the selector circuit 15. The output signal H from the inverter 11 is supplied to the second input terminal of the selector circuit 15. The selector circuit 15 selects one of the output signal S and the output signal H and produces it in response to the logical level of the output signal K. The inverter 16 receives an output signal L from the selector circuit 15 and produces an output signal C.

The selector circuit 12 uses as the selection control signal the second input signal Y. The selector circuit 12 selects an inverted signal of the first input signal X, that is, the output signal H from the inverter 11 when the second input signal Y is high. The selector signal 12 selects the first input signal X when the output signal Y is low. The selected one of the signals is produced as the output signal J. In this case, the logical level of the output signal J obtained in accordance with a combination of the logical levels of the input signals X and Y is shown in Table 1 below.

TABLE 1

| Input Signal | | Output Signal |
|---|---|---|
| X | Y | J |
| Low | Low | Low |
| Low | High | High |
| High | Low | High |
| High | High | Low |

Similarly, the selector circuit 14 uses as the selection control signal the third input signal Z. The selector circuit 14 selects an inverted signal of the output signal J, that is, the output signal K from the inverter 13 when the third input signal Z is high. The selector circuit 14 selects the output signal J when the third input signal Z is low. The selected one of the signals is produced as the sum output signal S. The logical levels of the sum output signal S obtained in accordance with a combination of the logical levels of the output signal J and the third input signal Z are shown in Table 2 below.

TABLE 3

| Signal | Input Signal | Sum Output Signal |
|---|---|---|
| J | Z | S |
| Low | Low | Low |
| Low | High | High |
| High | Low | High |
| High | High | Low |

The selector circuit 15 uses as the selection control signal the output signal K from the inverter 13. The selector circuit 15 selects an inverted signal of the first input signal X, that is, the output signal H from the inverter 11, when the output signal K is high. The selector circuit 15 selects the sum output signal S from the selector circuit 14, when the output signal K is low. The selected one of the signals is produced as the output signal L. The output signal L is inverted by the inverter 16 and is produced as the carry output signal C. Therefore, in this case, the logical levels of the output signal L and the carry output signal C obtained in accordance with a combination of the logical levels of the signal K and the first input signal X are shown in Table 3 below.

TABLE 4

| Signal | Input signal | Signal | Carry Output Signal |
|---|---|---|---|
| K | X | L | C |
| Low | Low | S | $\overline{S}$ |
| Low | High | S | $\overline{S}$ |
| High | Low | High | Low |
| High | High | Low | High |

In table 3, the signal $\overline{S}$ is the inverted signal of the signal S.

The results for summarizing the relationship among Tables 1, 2 and 3 are shown in Table 4 below.

TABLE 4

| Input Signal | | | Signal | Signal | Signal | Signal |
|---|---|---|---|---|---|---|
| X | Y | Z | J | K | S | C |
| Low | Low | Low | Low | High | Low | Low |

TABLE 4-continued

| Input Signal | | | Signal | Signal | Signal | Signal |
|---|---|---|---|---|---|---|
| X | Y | Z | J | K | S | C |
| Low | High | Low | High | Low | High | Low (= $\overline{S}$) |
| High | Low | Low | High | Low | High | Low (= $\overline{S}$) |
| High | High | Low | Low | High | Low | High |
| Low | Low | High | Low | High | High | Low |
| Low | High | High | High | Low | Low | High (= $\overline{S'}$) |
| High | Low | High | High | Low | Low | High (= $\overline{S}$) |
| High | High | High | Low | High | High | High |

As may be apparent from Table 4, the signal S is produced as the sum output signal in response to the first, second and third input signals X, Y and Z. The signal C is produced as the carry output signal in response to the signals X, Y and Z.

Figure 3:
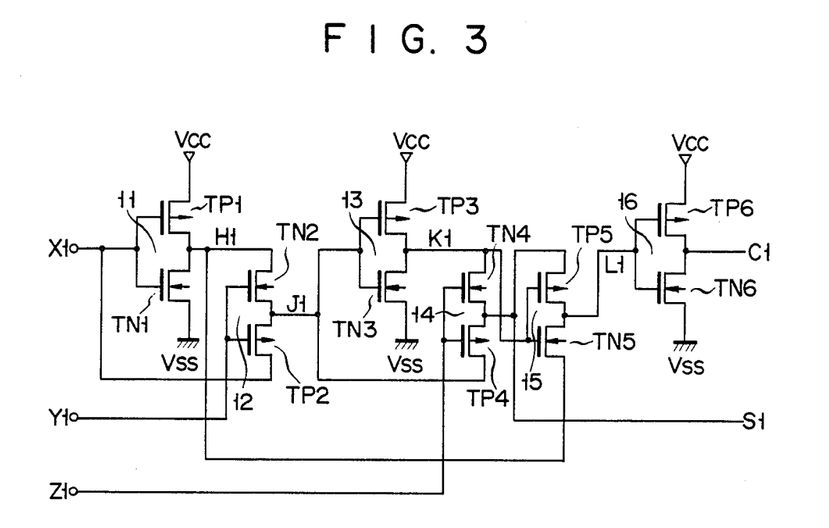
FIG. 3 is a circuit diagram showing one example in which complementary MOSFETs are used to obtain the full adder shown in FIG. 2.

FIG. 3 shows a circuit in which complementary MOSFETs are used to obtain the full adder shown in FIG. 2. Signals X1, Y1, Z1, H1, J1, K1, L1, S1 and C1 in FIG. 3 correspond to the signals X, Y, Z, H, J, K, L, S and C respectively. The inverter 11 is constituted by a CMOS inverter which comprises a p-channel MOSFET TP1 and an n-channel MOSFET TN1. The selector circuit 12 is constituted by an n-channel MOSFET TN2 and a p-channel MOSFET TP2 whose output terminals are connected to each other. The output signal H1 from the inverter 11 is supplied to the free end, that is, the input terminal of the n-channel MOSFET TN2. The input signal X1 is supplied to the free end, that is, the input terminal of the p-channel MOSFET TP2. The input signal Y1 is supplied as the selection control signal to the gates of the n- and p-channel MOSFETS TN2 and TP2. The output signal J1 is produced at the common node of the output terminal of the n- and p-channel MOSFETs TN2 and TP2. The inverter 13 is constituted by a CMOS inverter which comprises a p-channel MOSFET TP3 and an n-channel MOSFET TN3. The selector circuit 14 is constituted by an n-channel MOSFET TN4 and a p-channel MOSFET TP4 whose output terminals are connected to each other. The output signal K1 is supplied to the free end, that is, the input terminal of the n-channel MOSFET TN4. The output signal J1 is supplied to the free end, that is, the input terminal of the p-channel MOSFET TP4. The third input signal Z1 is supplied as the selection control signal to the gates of the n- and p-channel MOSFETs TN4 and TP4. The output signal S1 is produced at the common node of the output terminals of the n- and p-channel MOSFETs TN4 and TP4. The selector circuit 15 is constituted by a p-channel MOSFET TP5 and an n-channel MOSFET TN5 whose output terminals are connected to each other. The output signal S1 from the selector circuit 14 is supplied to the free end, that is, the input terminal of the p-channel MOSFET TP5. The output signal H1 from the inverter 11 is supplied to the free end, that is, the input terminal of the n-channel MOSFET TN5. The output signal K1 from the inverter 13 is supplied as the selection control signal to the gates of the p- and n-channel MOSFETs TP5 and TN5. The output signal L1 is produced at the common node of the output terminals of the p- and n-channel MOSFETs TP5 and TN5. The inverter 16 is constituted by a CMOS inverter which comprises a p-channel MOSFET TP6 and an n-channel MOSFET TN6.

The n-channel MOSFET TN2 is ON when the second input signal Y1 is high. The inverted signal H1 of the first input signal X1 is produced as the output signal J1 by the selector circuit 12. However, the p-channel MOSFET TP2 is ON when the second input signal Y1 is low. The selector circuit 12 selectively produces the first input signal X1. Therefore, the circuit arrangement using the n- and p-channel MOSFETs TN2 and TP2 is equivalent to the selector circuit 12 shown in FIG. 2. In the same manner as described above, the n-channel MOSFET TN4 is ON when the third input signal Z1 is high. The selector circuit 14 selectively produces the inverted signal K1 of the output signal J1. However, the p-channel MOSFET TP4 is ON when the third input signal Z1 is low. The selector circuit 14 selectively produces the signal J1. Therefore, the circuit arrangement using the n- and p-channel MOSFETs TN4 and TP4 is equivalent to the selector circuit 14 shown in FIG. 2. Furthermore, the p-channel MOSFET TP5 is ON when the signal K1 is low. The selector circuit 15 then selectively produces the sum output signal S1. However, the n-channel MOSFET TN5 is ON when the signal K1 is high. The selector circuit 15 then selectively produces the inverted signal H1 of the first input signal X1. Therefore, the circuit arrangement using the p- and n-channel MOSFETs TP5 and TN5 is equivalent to the selector circuit 15 shown in FIG. 2.

The circuit shown in FIG. 3 performs the function of the full adder shown in FIG. 2. In the circuit in FIG. 3, a total of only 12 MOSFETs are used. The number of elements is greatly decreased as compared with the conventional MOSFET adder. Therefore, the chip area of the full adder can be made compact when it is integrated.

Figure 4:
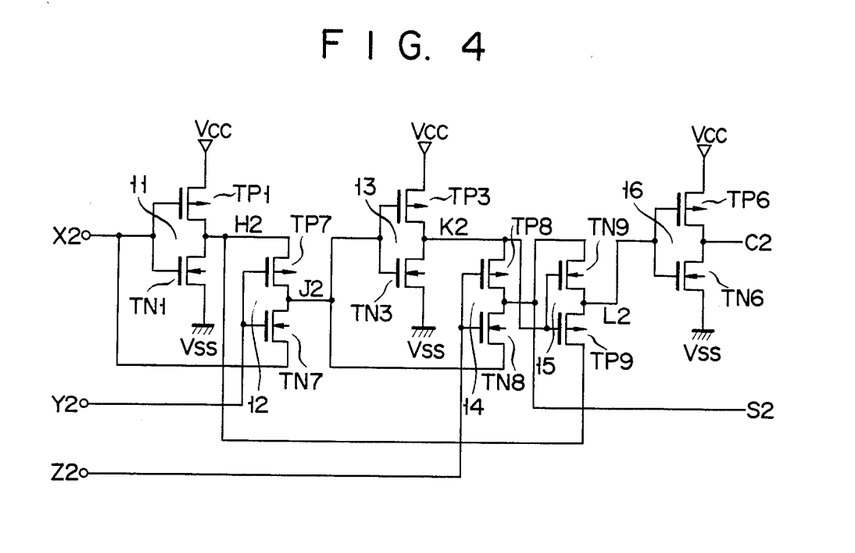
FIG. 4 is a circuit diagram showing another example in which complementary MOSFETs are used to obtain the full adder shown in FIG. 2.

FIG. 4 shows another example of a circuit in which the complementary MOSFETs are used to obtain the full adder shown in FIG. 2. Signals X2, Y2, Z2, H2, J2, K2, L2, S2 and C2 in FIG. 4 correspond to the signals X, Y, Z, H, J, K, L, S and C respectively. The circuit shown in FIG. 4 is the same as that in FIG. 3 except that selector circuits 12, 14 and 15 are connected in a different manner. The signal selection function based on the selection control signals is opposite to that shown in FIG. 3.

The selector circuit 12 is constituted by a p-channel MOSFET TP7 and an n-channel MOSFET TN7 whose output terminals are connected to each other. The output signal H2 from the inverter 11 is supplied to the free end, that is, the input terminal of the p-channel MOSFET TP7. The first input signal X2 is supplied to the free end, that is, the input terminal of the n-channel MOSFET TN7. The second input signal Y2 is supplied as the selection control signal to the gates of the n- and p-channel MOSFETs TN7 and TP7. The signal J2 is produced at the common node of the output terminals of the p- and n-channel MOSFETS TP7 and TN7. The selector circuit 14 is constituted by a p-channel MOSFET TP8 and an n-channel MOSFET TN8 whose output terminals are connected to each other. The output signal K2 from the inverter 13 is supplied to the free end, that is, the input terminal of the MOSFET TP8. The output signal J2 from the selector circuit 12 is supplied to the free end, that is, the input terminal of the n-channel MOSFET TN8. The third input signal Z2 is supplied as the selection control signal to the gates of the p- and n-channel MOSFETs TP8 and TN8. The signal S2 is produced at the common node of the output terminals of the p- and n-channel MOSFETs TP8 and TN8. The selector circuit 15 is constituted by an n-channel MOSFET TN9 and a p-channel MOSFET TP9 whose output terminals are connected to each other. The output signal S2 from the selector circuit 14 is supplied to the free end, that is, the input terminal of the MOSFET TN9. The output signal H2 from the inverter 11 is supplied to the free end, that is, the input terminal of the p-channel MOSFET TP9. The output signal K2 from the inverter 13 is supplied as the selection control signal to the gates of the n- and p-channel MOSFETs TN9 and TP9. The signal L2 is produced at the common node of the output terminals of the n- and p-channel MOSFETs TN9 and TP9.

The n-channel MOSFET TN7 is ON when the second input signal Y2 is high. The selector circuit 12 selectively produces the first input signal X2. However, the p-channel MOSFET TP7 is ON when the second input signal Y2 is low. The selector circuit 12 selectively produces the inverted signal of the first input signal X2, that is, the signal H2. The selector circuit 12 selectively produces a signal in response to a selection control signal which has the logical level opposite to that of the signal in FIG. 3. In this case, the logical levels of the signal J2 obtained in accordance with a combination of the first and second input signals X2 and Y2 are shown in Table 5 below.

TABLE 5

| Input Signal | | Output Signal |
|---|---|---|
| X2 | Y2 | J2 |
| Low | Low | High |
| Low | High | Low |
| High | Low | Low |
| High | High | High |

The n-channel MOSFET TN8 is ON when the third input signal Z2 is high. The selector circuit 14 selectively produces the signal J2. However, the p-channel MOSFET TP8 is ON when the third input signal Z2 is low. The selector signal 14 then selectively produces the output signal K2 of the inverter 13. Thus, the selector circuit 14 selectively produces a signal which has a logical level opposite to that of the signal in FIG. 3. The logical levels of the sum output signal S2 in accordance with a combination of the logical levels of the signal J2 and the third input signal Z2 are shown in Table 6 below.

TABLE 6

| Signal<br>J2 | Input Signal<br>Z2 | Sum Output Signal<br>S2 |
|---|---|---|
| Low | Low | High |
| Low | High | Low |
| High | Low | Low |
| High | High | High |

The p-channel MOSFET TP9 is ON when the signal K2 is low. The selector circuit 15 selectively produces the inverted signal of the first input signal X2, that is, the output signal H2 from the inverter. However, the n-channel MOSFET TN9 is ON when the signal K2 is high. The selector circuit 15 then selectively produces the sum output signal S2. The output signal L2 from the selector circuit 15 is inverted by the inverter 16 and is produced as the carry output signal C2 therefrom. Therefore, the logical levels of the signal L2 and the carry output signal C2 in accordance with a combination of the logical levels of the signal K2 and the input signal X2 are shown in Table 7 below.

TABLE 7

| Signal K2 | Input Signal X2 | Signal L2 | Carry Output Signal C2 |
|---|---|---|---|
| Low | Low | High | Low |
| Low | High | Low | High |
| High | Low | S | S |
| High | High | S | S |

The results of Tables 5, 6 and 7 are summarized in Table 8 below.

TABLE 8

| Input Signal | | | Signal | Signal | Signal | Signal |
|---|---|---|---|---|---|---|
| X2 | Y2 | Z2 | J2 | K2 | S2 | C2 |
| Low | Low | Low | High | Low | Low | Low |
| Low | High | Low | Low | High | High | Low (= $\overline{S}$) |
| High | Low | Low | Low | High | High | Low |
| High | High | Low | High | Low | Low | High |
| Low | Low | High | High | Low | High | Low |
| Low | High | High | Low | High | Low | High (= $\overline{S}$) |
| High | Low | High | Low | High | Low | High (= $\overline{S}$) |
| High | High | High | High | Low | High | High |

In the circuit shown in FIG. 4, the signal S2 is produced as the sum output signal, and the signal C2 is produced as the carry output signal in response to the input signals X2, Y2 and Z2, in the same manner as in the circuit shown in FIG. 3. Since the circuit shown in FIG. 4 comprises 12 MOSFETs, the number of elements is decreased to provide a highly integrated MOSFET adder.

Figure 5:
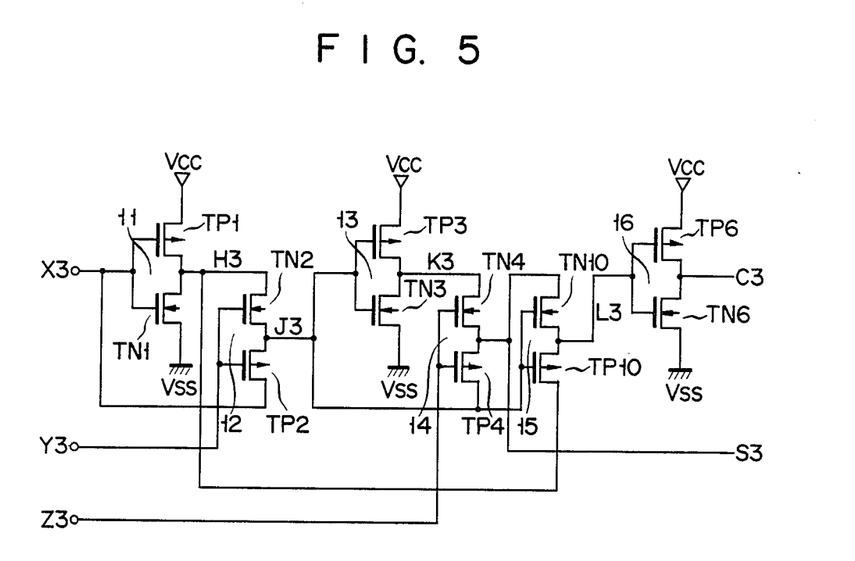
FIG. 5 is a circuit diagram showing a modification of the circuit shown in FIG. 3.

FIG. 5 shows a modification of the circuit shown in FIG. 3. The circuit in FIG. 5 is the same as that in FIG. 3 except that a selector circuit 15 is connected in a different manner. Referring to FIG. 5, the selector circuit 15 is constituted by an n-channel MOSFET TN10 and a p-channel MOSFET TP10 whose output terminals are connected to each other. A sum output signal S3 is supplied to the free end, that is, the input terminal of the n-channel MOSFET TN10. A signal H3 is supplied to the free end, that is, the input terminal of the p-channel MOSFET TP10. A signal J3 is supplied as the selection control signal to the gates of the n- and p-channel MOSFETs TN10 and TP10. The circuit shown in FIG. 5 is the same as that in FIG. 3 except that the positions of the n- and p-channel MOSFETs of the selector circuit 15 are reversed. Thus, the signal J3 which is the inverted signal of the signal K1 is used. Therefore, the circuit in FIG. 5 is logically equivalent to that in FIG. 3 if the conductivity type of the MOSFETs and the logical level of the gate signal are properly selected.

Figure 6:
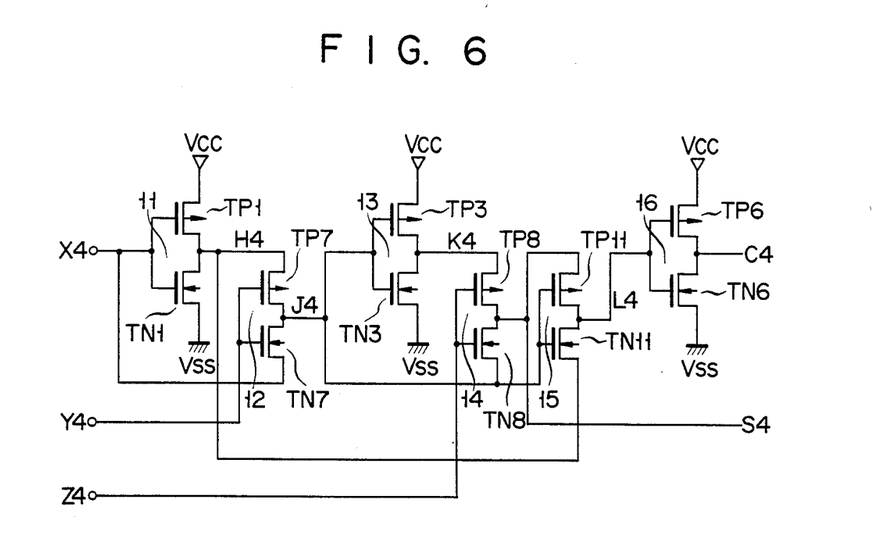
FIG. 6 is a circuit diagram showing a modification of the circuit shown in FIG. 3.

FIG. 6 shows a modification of the circuit shown in FIG. 4. The circuit in FIG. 6 is substantially the same as that in FIG. 4 except that a selector circuit 15 is connected in a different manner. Referring to FIG. 6, the selector circuit 15 is constituted by a p-channel MOSFET TP11 and an n-channel MOSFET TN11 whose output terminals are connected to each other. A signal S4 is supplied to the free end, that is, the input terminal of the p-channel MOSFET TP11. A signal H4 is supplied to the free end, that is, the input terminal of the MOSFET TN11. A signal J4 is supplied as the selection control signal to the gates of the p- and n-channel MOSFETs TP11 and TN11. Since the positions of the n- and p-channel MOSFETs are reversed as compared with the selector circuit 15 in FIG. 15, the signal J4 which is an inverted signal of the signal K2 is used in place of the signal K2. The circuit shown in FIG. 6 is logically equivalent to that shown in FIG. 4 if the conductivity type of the MOSFETs and the logical level of the gate signal are properly selected.

Figure 7:
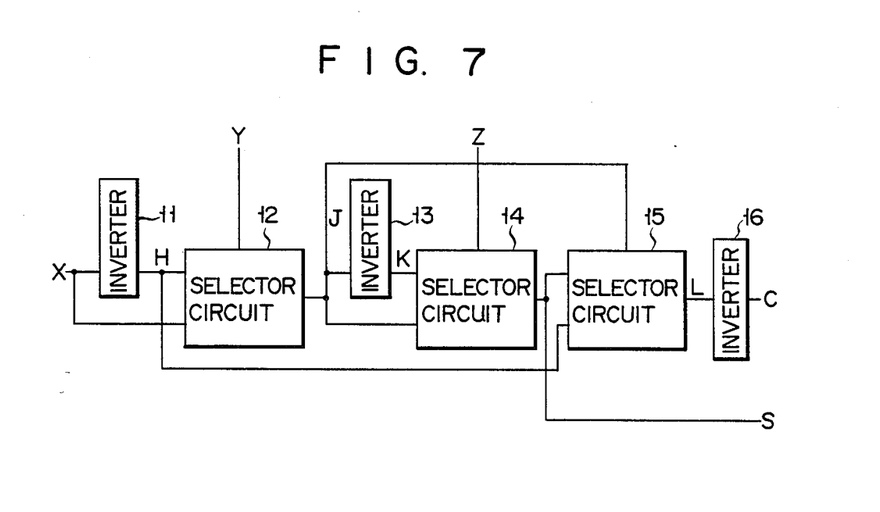
FIG. 7 is a block diagram of a circuit corresponding to the circuits shown in FIGS. 5 and 6.

FIG. 7 is a block diagram of the circuits shown in FIGS. 5 and 6.

Figure 8:
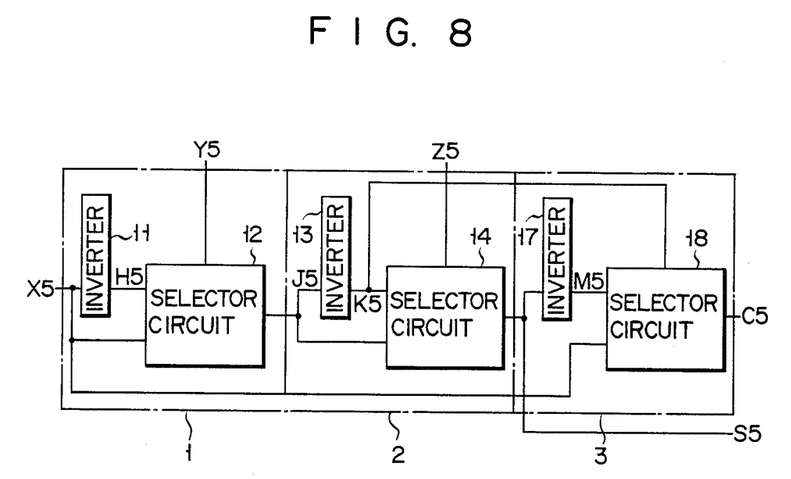
FIG. 8 is a block diagram of a full adder according to a second embodiment of the present invention.

FIG. 8 shows a full adder according to a second embodiment of the present invention. Logic circuits 1 and 2 have the same configurations as those shown in FIG. 2. A logic circuit 3 is different from that shown in FIG. 2. The logic circuit 3 has an inverter 17 and a selector circuit 18. The inverter 17 receives an output signal S5 from the selector circuit 14 and produces a signal M5. The output signal M5 is supplied to the first input terminal of the selector circuit 18. A first input signal X5 is supplied to the second input terminal of the selector circuit 18. An output signal K5 from the inverter 13 is supplied to the third input terminal of the selector circuit 18. The selector circuit 18 selectively produces one of the output signal M5 from the inverter 17 and the first input signal X5 in accordance with the logical level of the signal K5. The output signal from the selector circuit 18 is produced as a carry output signal C5.

The selector circuit 18 selectively produces the first input signal X5 when the signal K5 is high. However, the selector circuit 18 selectively produces the inverted signal M5 of the sum output signal S5 when the signal K5 is low. The selected signals are produced as the carry output signals C5. Therefore, in this case, the logical levels of the output signals C5 obtained in accordance with the logical levels of the input signal X5 and the signal K5 are shown in Table 9 below.

TABLE 9

| Signal K5 | Input Signal X5 | Carry Output Signal C5 |
|---|---|---|
| Low | Low | $\overline{S5}$ |
| Low | High | $\overline{S5}$ |
| High | Low | Low |
| High | High | High |

The relationship between the signals is equivalent to that shown in Table 3. Thus, it is apparent that the circuit described above functions as the full adder.

Let us explain that even if a second signal Y5 instead of the first signal X5 is supplied to the second input terminal of the selector circuit 18 shown in FIG. 8, the circuit functions as the full adder. The relationship corresponding to that shown in Table 9 is shown in Table 10 below.

TABLE 10

| Signal K5 | Input Signal Y5 | Carry Output Signal C5 |
|---|---|---|
| Low | Low | $\overline{S5}$ |
| Low | High | $\overline{S5}$ |
| High | Low | Low |
| High | High | High |

The relationship between the signals in the selector circuits 12 and 14 corresponds to that shown in Tables 1 and 2. Changes in the logical levels of the signals J5, K5, S5 and C5 based on changes in the logical levels of the first, second and third input signals X5, Y5 and Z5 are shown in Table 11 below.

TABLE 11

| Input Signal | | | Signal | Signal | Signal | Signal |
| X5 | Y5 | Z5 | J5 | K5 | S5 | C5 |
| --- | --- | --- | --- | --- | --- | --- |
| Low | Low | Low | Low | High | Low | Low |
| Low | High | Low | High | Low | High | Low (= $\overline{S5,3}$) |
| High | Low | Low | High | Low | High | Low (= $\overline{S5,3}$) |
| High | High | Low | Low | High | Low | High |
| Low | Low | High | Low | High | High | Low |
| Low | High | High | High | Low | Low | High (= $\overline{S5,3}$) |
| High | Low | High | High | Low | Low | High (= $\overline{S5,3}$) |
| High | High | High | Low | High | High | High |

As may be apparent from Table 11, even if the signal Y5 is supplied to the selector circuit 18 in place of the first input signal X5, the circuit shown in FIG. 8 functions as the full adder.

Examples of the circuits will be described with reference to FIGS. 9 to 16 in which complementary MOSFETs are used to obtain the full adder shown in FIG. 8. The circuit shown in FIG. 9 corresponds to that shown in FIG. 8. An inverter 17 is constituted by a CMOS inverter which comprises a p-channel MOSFET TP12 and an n-channel MOSFET TN12. The selector circuit 18 is constituted by a p-channel MOSFET TP13 and an n-channel MOSFET TN13. An output signal M6 from the inverter 17 is supplied to the input terminal of the p-channel MOSFET TP13. An input signal X6 is supplied to the input terminal of the n-channel MOSFET TN13. A signal K6 is supplied as the selection control signal to the gates of the p- and n-channel MOSFETs TP13 and TN13.

Figure 10:
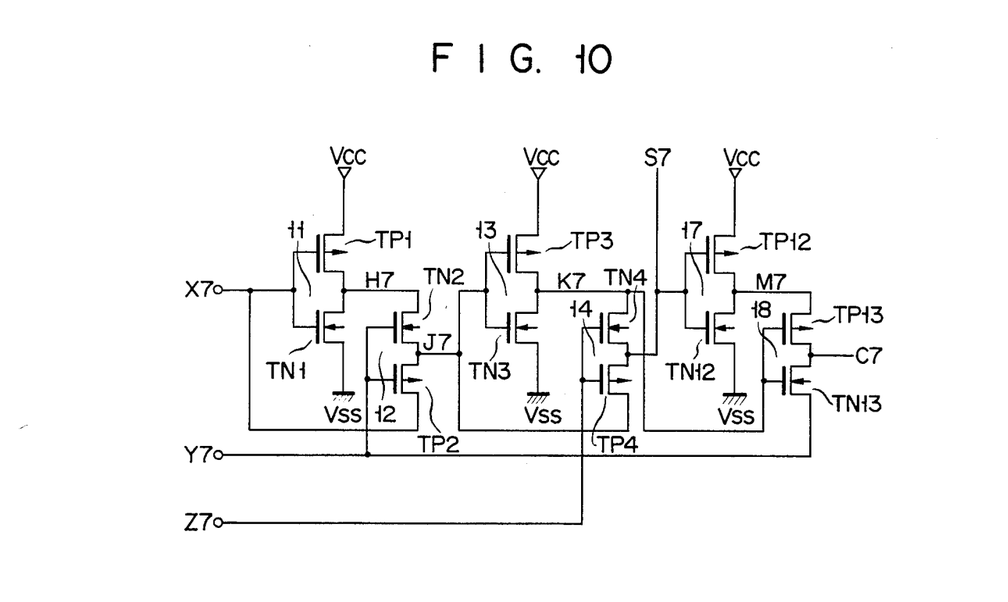

In the circuit shown in FIG. 10, a second input signal Y7, instead of the first input signal X6, is supplied to the second input terminal of the selector circuit 18.

Figure 9:
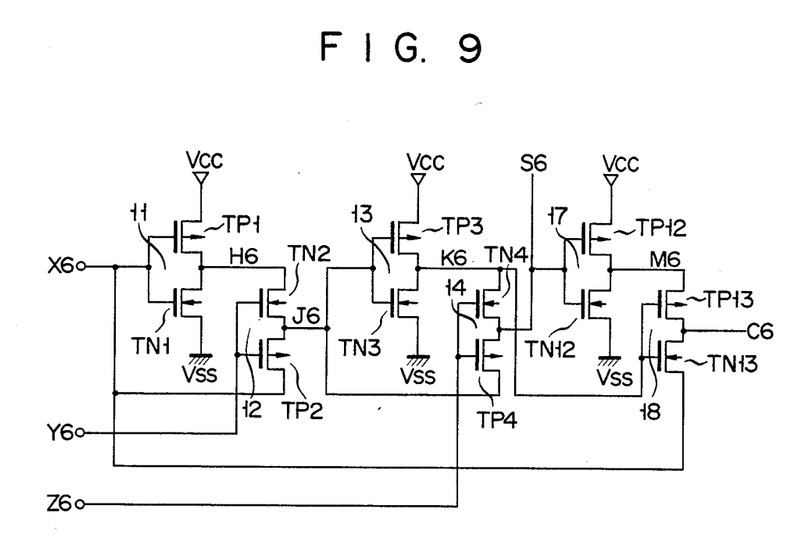
FIGS. 9 to 16 are circuit diagrams of circuits in which complementary MOSFETs are used to obtain the full adder shown in FIG. 8.
Figure 11:
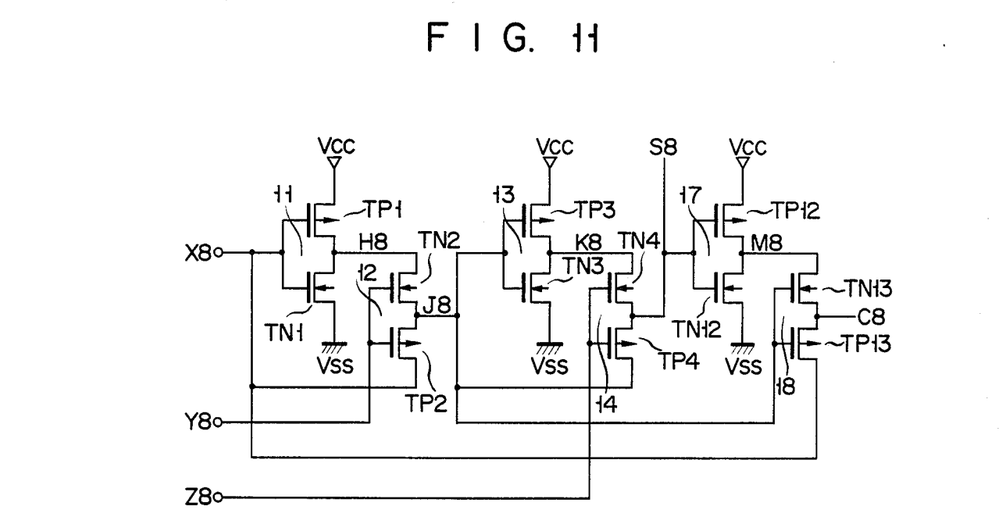

In the circuit shown in FIG. 11, the positions of the p- and n-channel MOSFETs of the selector circuit 18 are reversed as compared with those in the circuit shown in FIG. 9. Therefore, a signal J8 is used instead of the signal K6 as the selection control signal.

Figure 12:
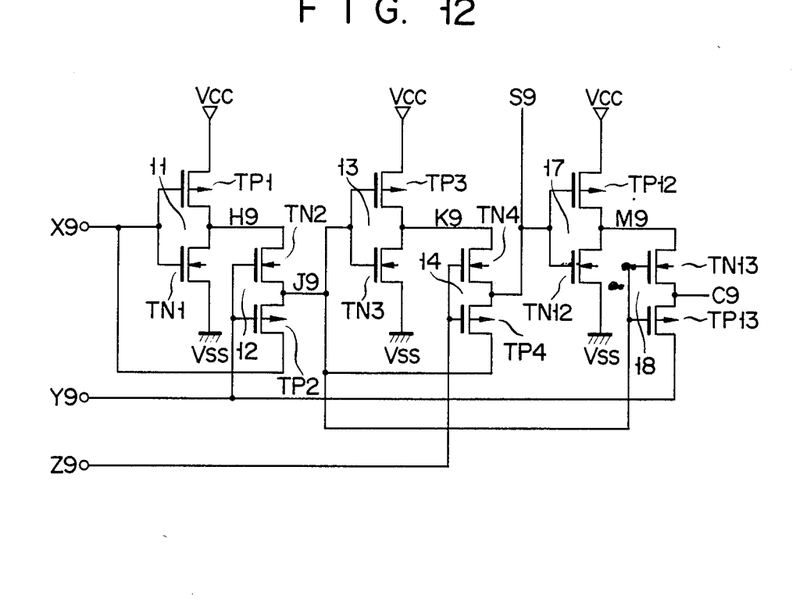

In the circuit shown in FIG. 12, the positions of the p- and n-channel MOSFETs of the selector circuit 18 are reversed as compared with those in the circuit shown in FIG. 10. Therefore, a signal J9 is used instead of a signal K7 as the selection control signal.

Figure 13:
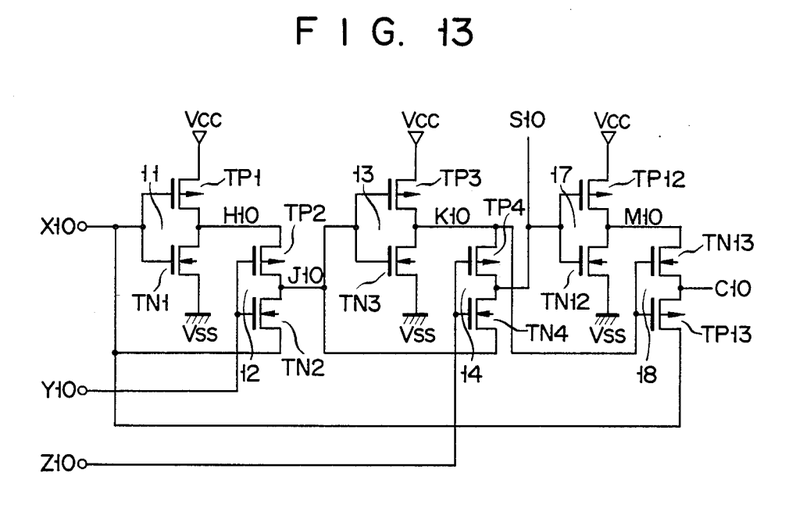

In the circuit shown in FIG. 13, the positions of the p- and n-channel MOSFETs of the selector circuits 12, 14 and 18 are reversed as compared with those in the circuit shown in FIG. 9.

Figure 14:
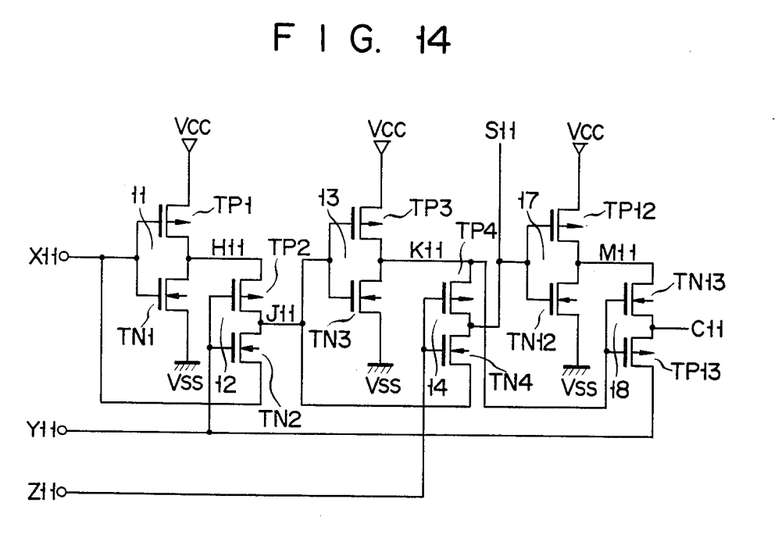

In the circuit shown in FIG. 14, the positions of the p- and n-channel MOSFETs of the selector circuits 12, 14 and 18 are reversed as compared with those in the circuit shown in FIG. 10.

Figure 15:
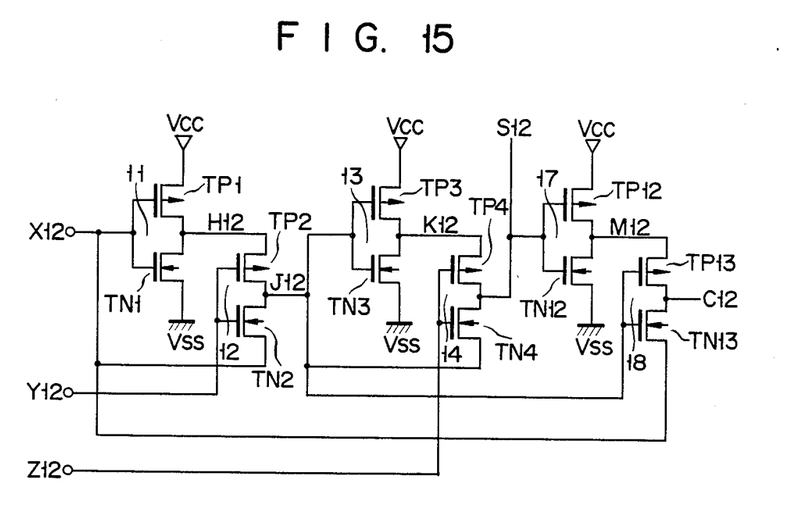

In the circuit shown in FIG. 15, the positions of the p- and n-channel MOSFETs of the selector circuits 12, 14 and 18 are reversed as compared with those in the circuit shown in FIG. 11.

Figure 16:
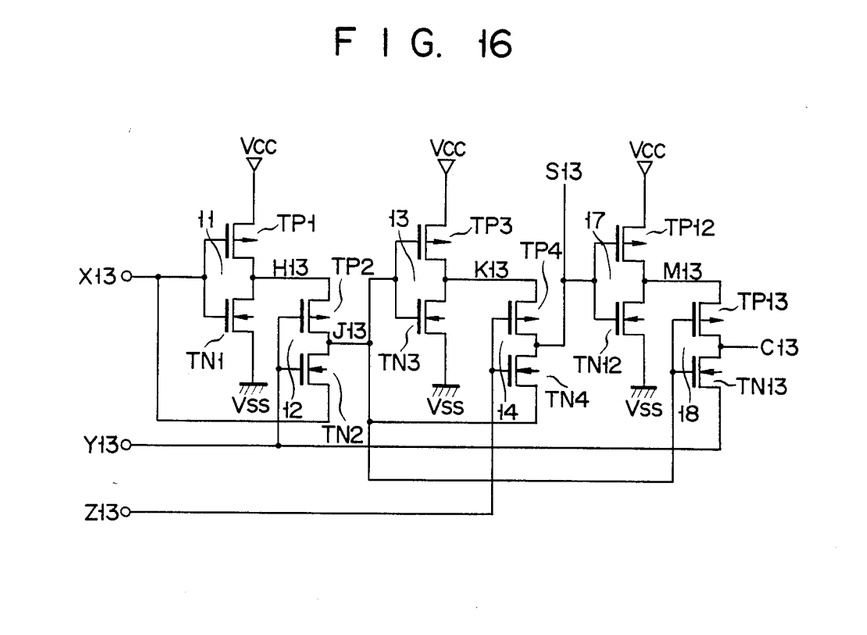

In the circuit shown in FIG. 16, the positions of the p- and n-channel MOSFETs of the selector circuits 12, 14 and 18 are reversed as compared with those in the circuit shown in FIG. 12.

Figure 17:
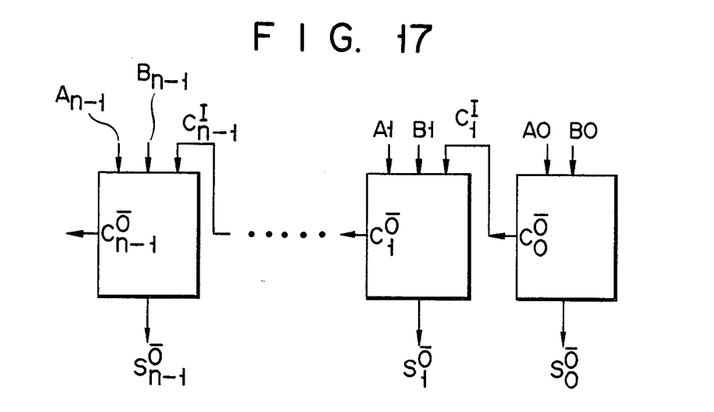
FIG. 17 is a block diagram of a parallel adder circuit to which the full adder of the present invention is applied.

FIG. 17 shows a parallel adder circuit to which the full adder according to the present invention is applied. In an n-bit parallel adder circuit, assume that two input signals supplied to each-bit full adder are defined as Aj and Bj (j=0 to n-1), that a carry input signal from a lower bit is defined as $C_j{}^i$, a sum output signal is defined as Si, and a carry output signal to an upper bit is defined as $C_j{}^o$. The full adders of the present invention are aligned to be parallel to each other. The carry output signal from the lower-bit full adder is supplied as the carry input signal to the adjacent higher-bit full adder. Each full adder receives two input signals each of which corresponds to each bit and the carry output signal from the immediately preceding lower-bit full adder to obtain a sum output signal and a carry output signal. In the full adders shown in FIGS. 3 to 6 and FIGS. 9 to 16, assignment of the input signals Aj, Bj and $C_j{}^i$ to the input signals Xi, Yi and Zi (i=1 to 4, and 6 to 13) may be arbitrarily determined for each bit. When the carry input signal $C_j{}^i$ is assigned to the input signal Z, high-speed operation of the full adders can be achieved. Since two input signals are supplied in advance to each full adder, the carry input signal supplied from the immediately preceding lower-bit full adder determines the operation speed of the parallel adder. When the carry input signal $C_j{}^i$ is supplied near the output terminal, high-speed operation can be performed. It is noted that if the full adders are used as cells of a parallel multiplier, a sum output signal SR from other full adders is preferably assigned to the input signal Xi. However, an assignment method may not be limited to the above case. A more free assignment can also be performed.

What is claimed is:
1. A full adder comprising:
a first logic circuit having first signal inverting means which receives a first input signal and produces a first output signal, and first signal selecting means which receives said first input and said first output signal and produces a second output signal which is equal to one of said first input signal or said first output signal depending on the state of a second input signal;
a second logic circuit having second signal inverting means which receives said second output signal and produces a third output signal, and second signal selecting means which receives said second output signal and said third output signals and produces a fourth output signal which is equal to one of said second or third outputs signal depending on the state of a third input signal; and
a third logic circuit which receives said first output signal and said fourth output signal and produces a fifth output signal which is equal to one of said last-mentioned signals depending on the state of said third output signal.

2. A full adder according to claim 1, wherein said fourth output signal is the sum of said first, second and third input signals.

3. A full adder according to claim 1, wherein said third logic circuit comprises third signal inverting means and third signal selecting means.

4. A full adder according to claim 3, wherein said third signal selecting means receives said fourth output signal and said first output signal and produces said fifth output signal in response to the state of said third output signal, and said third signal inverting means receives said fifth output signal.

5. A full adder according to claim 4, wherein said third signal selecting means comprises two MOSFETs of different conductivity types whose output terminals are connected to each other, said first output signal and said fourth output signal are supplied to the free ends of said two MOSFETs, said third output signal is supplied to the gates of said two MOSFETs, and said fifth output signal is obtained at the connection point between said output terminals of said two MOSFETs.

6. A full adder according to claim 3, wherein each of said first and second signal selecting means comprises two MOSFETs of different conductivity types whose output terminals are connected to each other, in said first signal selecting means, said first output signal and said first input signal are supplied to the free ends of said two MOSFETs, said second input signal is supplied to the gates of said two MOSFETs, and said second output signal is obtained at the connection point between said output terminals of said two MOSFETs, and in said second signal selecting means, said second output signal and said third output signal are supplied to the free ends of said two MOSFETs, said third input signal is supplied to the gates of said two MOSFETs, and said fourth output signal is obtained at the connecting point between said output terminals of said two MOSFETs.

7. An operation circuit including a plurality of full adders each of which comprises:
a first logic circuit having first signal inverting means which receives a first input signal and produces a first output signal, and first signal selecting means which receives said first input signal and said first output signal and produces a second output signal which is equal to one of said first input signal or said first output signal depending on the state of a second input signal;
a second logic circuit having second signal inverting means which receives said second output signal and produces a third output signal, and second signal selecting means which receives said second output signal and said third output signal and produces a fourth output signal which is equal to one of said second or third output signals depending on the state of a third input signal; and
a third logic circuit which receives said first output signal and said fourth output signal and produces a fifth output signal which is equal to one of said last-mentioned signals depending on the state of said third output signal.

8. A binary adder circuit receiving first, second and third binary input signals and producing binary sum and carry output signals in response thereto, comprising:
a first stage including complementary MOSFET inverter means and complementary MOSFET selector means, said inverter means receiving said first input signal and producing an inverted first input signal and said selector means receiving said first input signal, said inverted first input signal and said second input signal and generating a first intermediate output signal which is equal to either said first input signal or said inverted first input signal depending on the binary state of said second input signal;
a second stage including complementary MOSFET inverter means and complementary MOSFET selector means, said inverter means receiving said first intermediate output signal and producing an inverted first intermediate output signal and said selector means receiving said first intermediate output signal, said inverted first intermediate output signal and said third input signal and generating said sum output signal which is equal to either said first intermediate output signal or said inverted first intermediate output signal depending on the binary state of said third input signal; and
a third stage including complementary MOSFET inverter means and complementary MOSFET selector means, said selector means receiving said sum output signal, said inverted first input signal, and said inverted first intermediate output signal and generating a second intermediate output signal which is equal to either said sum output signal or said inverted first input signal depending on the binary state of said inverted first intermediate output signal, and said inverter means receiving said second intermediate output signal and inverting it to produce said carry output signal.

9. A full adder comprising:
a first logic circuit having first signal inverting means which receives a first input signal and produces a first output signal, and first signal selecting means which receives said first input and said first output signal and produces a second output signal which is equal to one of said first input signal or said first output signal depending on the state of a second input signal;
a second logic circuit having second signal inverting means which receives said second output signal and produces a third output signal, and second signal selecting means which receives said second output signal and said third output signal and produces a fourth output signal which is equal to one of said second or third output signals depending on the state of a third input signal; and
a third logic circuit which receives said first input signal and said fourth output signal and produces a fifth output signal which is equal to said first input signal or the complement of said fourth output signal depending on the state of said third output signal.

10. A full adder according to claim 9, wherein said fourth output signal is the sum of said first, second and third input signals.

11. A full adder according to claim 9, wherein said third logic circuit comprises third signal inverting means and third signal selecting means.

12. A full adder according to claim 11, wherein said third signal inverting means receives said fourth output signal and produces said complement of said fourth output signal and said third signal selecting means receives said complement of said fourth output signal and said first input signal and produces said fifth output signal in response to the state of said third output signal.

13. A full adder according to claim 11, wherein each of said first and second signal selecting means comprises two MOSFETs of different conductivity types whose output terminals are connected to each other, in said first signal selecting means, said first output signal and said first input signal are supplied to the free ends of said two MOSFETs, said second input signal is supplied to the gates of said two MOSFETs, and said second output signal is obtained at the connection point between said output terminals of said two MOSFETs, and in said second signal selecting means, said second output signal and said third output signal are supplied to the free ends of said two MOSFETs, said third input signal is supplied to the gates of said two MOSFETs, and said fourth output signal is obtained at the connecting point between said output terminals of said two MOSFETs.

14. A full adder according to claim 13, wherein said third signal selecting means comprises two MOSFETs of different conductivity types whose output terminals are connected to each other, said first input signal and said complement of said fourth output signal are supplied to the free ends of said two MOSFETs, said third output signal is supplied to the gates of said two MOSFETs, and said fifth output signal is obtained at the connection point between said output terminals of said two MOSFETs.

* * * * *